(12) United States Patent
Kamamoto et al.

(10) Patent No.: US 10,520,027 B2
(45) Date of Patent: Dec. 31, 2019

(54) TAPERED ROLLER BEARING

(71) Applicant: JTEKT CORPORATION, Osaka-shi, Osaka (JP)

(72) Inventors: Shigeo Kamamoto, Kashiwara (JP); Junji Murata, Kashiba (JP); Yuki Shishihara, Kashiwara (JP); Seiji Nakahama, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 2 days.

(21) Appl. No.: 15/631,360

(22) Filed: Jun. 23, 2017

(65) Prior Publication Data
US 2018/0003228 A1 Jan. 4, 2018

(30) Foreign Application Priority Data
Jun. 30, 2016 (JP) .................. 2016-130150

(51) Int. Cl.
*F16C 33/36* (2006.01)
*F16C 33/46* (2006.01)

(52) U.S. Cl.
CPC ........ *F16C 33/366* (2013.01); *F16C 33/4605* (2013.01); *F16C 33/4617* (2013.01)

(58) Field of Classification Search
CPC .... F16C 19/364; F16C 33/366; F16C 33/383; F16C 33/385; F16C 33/386; F16C 33/4605; F16C 33/4617; F16C 33/4635; F16C 33/4676; F16C 33/4682; F16C 33/664; F16C 33/6674; F16C 33/6681
See application file for complete search history.

(56) References Cited

U.S. PATENT DOCUMENTS

| 4,425,011 A | * | 1/1984 | Cunningham | ........ F16C 19/364 384/571 |
| 4,787,757 A | * | 11/1988 | Finger | ................... F16C 19/385 384/470 |
| 2016/0319873 A1 | * | 11/2016 | Suzuki | ................ F16O 33/4635 |

FOREIGN PATENT DOCUMENTS

| JP | 2007-154936 | * | 6/2007 |
| JP | 2014-202341 A | | 10/2014 |
| JP | 2014-214771 | * | 11/2014 |
| JP | 2015-21515 | * | 2/2015 |

* cited by examiner

*Primary Examiner* — James Pilkington
(74) *Attorney, Agent, or Firm* — Oliff PLC (57) ABSTRACT

A tapered roller bearing includes an inner ring, an outer ring, a plurality of tapered rollers, and an annular cage that holds the tapered rollers. The cage has a small annular portion positioned toward the axially first side with respect to the tapered rollers, a large annular portion positioned toward the axially second side with respect to the tapered rollers, and a plurality of cage bars that couples the small annular portion and the large annular portion together, and the cage is enabled to come into contact with an inner peripheral surface of the outer ring so that the contact allows the cage to be positioned in a radial direction. The small annular portion is provided with introduction channels through which lubricant is enabled to be introduced from a bearing exterior on the axially first side into an annular space formed between the inner and outer rings.

12 Claims, 7 Drawing Sheets

[Related Art]

TAPERED ROLLER BEARING

INCORPORATION BY REFERENCE

The disclosure of Japanese Patent Application No. 2016-130150 filed on Jun. 30, 2016 including the specification, drawings and abstract, is incorporated herein by reference in its entirety.

BACKGROUND OF THE INVENTION

1. Field of the Invention

The invention relates to a tapered roller bearing.

2. Description of the Related Art

Tapered roller bearings are widely used for various machines and used, for example, as bearings for differential pinions in ordinary-sized automobiles. For ordinary-sized automobiles, reduced rotational resistance of components contributes to a reduction in fuel consumption. Thus, in particular, there has been a demand to reduce a torque applied to a tapered roller bearing used for a travel driving system. Resistance resulting from rotation of the tapered roller bearing includes stirring resistance of lubricant. Thus, when a tapered roller bearing is used for a differential pinion in an ordinary-sized automobile, a cage may be used to limit flow of lubricant into a bearing interior so as to inhibit an excessive amount of lubricant from being fed into the bearing interior (see, for example, Japanese Patent Application Publication No. 2014-202341 (JP 2014-202341 A).

Figure 7:
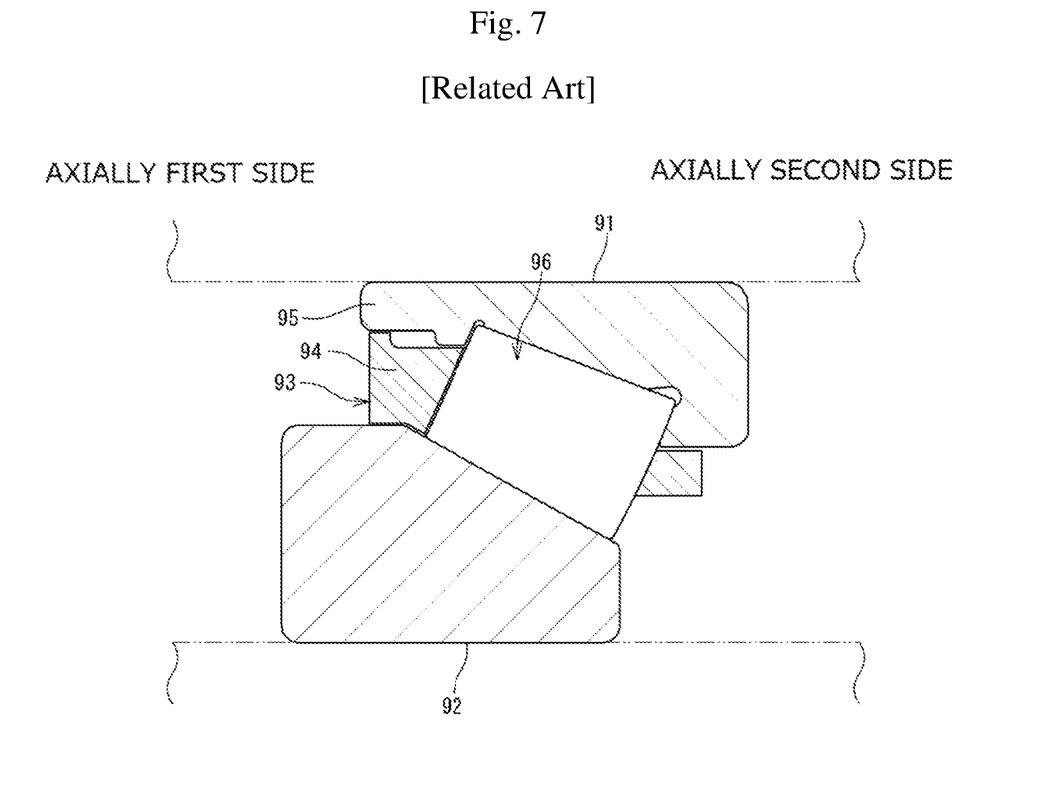
FIG. 7 is a sectional view of a conventional tapered roller bearing.

Specifically, rotation of the tapered roller bearing results in a pump action that allows the lubricant to flow from a first side (in FIG. 7, a left side) to a second side (in FIG. 7, a right side) in an axial direction. This restrains the lubricant in a bearing exterior on the axially first side from flowing into the bearing interior (annular space 96) between an inner ring 91 and an outer ring 92. To achieve this, a clearance between a small annular portion 94 of a cage 93 and an axially-first-side end 95 of the inner ring 91 is reduced in size. A clearance between the small annular portion 94 and the outer ring 92 is also reduced in size. This inhibits an excessive amount of lubricant from being fed into the annular space 96 as a result of the pump action. Thus, the stirring resistance of the lubricant can be reduced, enabling contribution to a reduction in fuel consumption.

Unlike the ordinary-sized automobiles, construction machines such as wheel loaders, are often used in harsh environments. Consequently, for tapered roller bearings for such construction machines, reduced temperature elevation has been more desirable than a reduction in the stirring resistance of the lubricant during rotation of the bearing. In such construction machines, a traveling direction is more frequently switched between a forward direction and a backward direction than in the ordinary-sized automobiles. Thus, the tapered roller bearing used for the travel driving system such as a differential pinion is frequently switched between forward rotation and backward rotation. In this case, if the orientation of tapered rollers provided between the outer ring and the inner ring is unstable, the tapered rollers may be skewed and slippage or the like may occur to damage raceway surfaces. Moreover, unlike the ordinary-sized automobiles, construction machines do not undergo periodic maintenance, and an environment around the tapered roller bearing may be such that only a small amount of lubricant is present as a result of consumption. When the tapered roller bearing is used in the environment where only a small amount of lubricant is present and fails to be supplied with lubricant, the tapered roller bearing may be subjected to a rise in temperature, leading to seizure or the like.

SUMMARY OF THE INVENTION

An object of the invention is to provide a tapered roller bearing that enables tapered rollers to be stably held, while allowing temperature elevation of the bearing to be suppressed.

A tapered roller bearing in an aspect of the invention includes an inner ring having, on an outer peripheral side, a conical inner raceway surface with a diameter increasing from an axially first side toward an axially second side, an outer ring having, on an inner peripheral side, a conical outer raceway surface with a diameter increasing from the axially first side toward the axially second side, a plurality of tapered rollers provided in an annular space formed between the inner ring and the outer ring and rolling on the inner raceway surface and the outer raceway surface, and an annular cage that holds the tapered rollers. The cage has a small annular portion positioned toward the axially first side with respect to the tapered rollers, a large annular portion positioned toward the axially second side with respect to the tapered rollers, and a plurality of cage bars that couples the small annular portion and the large annular portion together. The cage is enabled to come into contact with an inner peripheral surface of the outer ring so that the contact allows the cage to be positioned in a radial direction. The small annular portion is provided with introduction channels through which lubricant is enabled to be introduced from a bearing exterior on the axially first side into the annular space.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
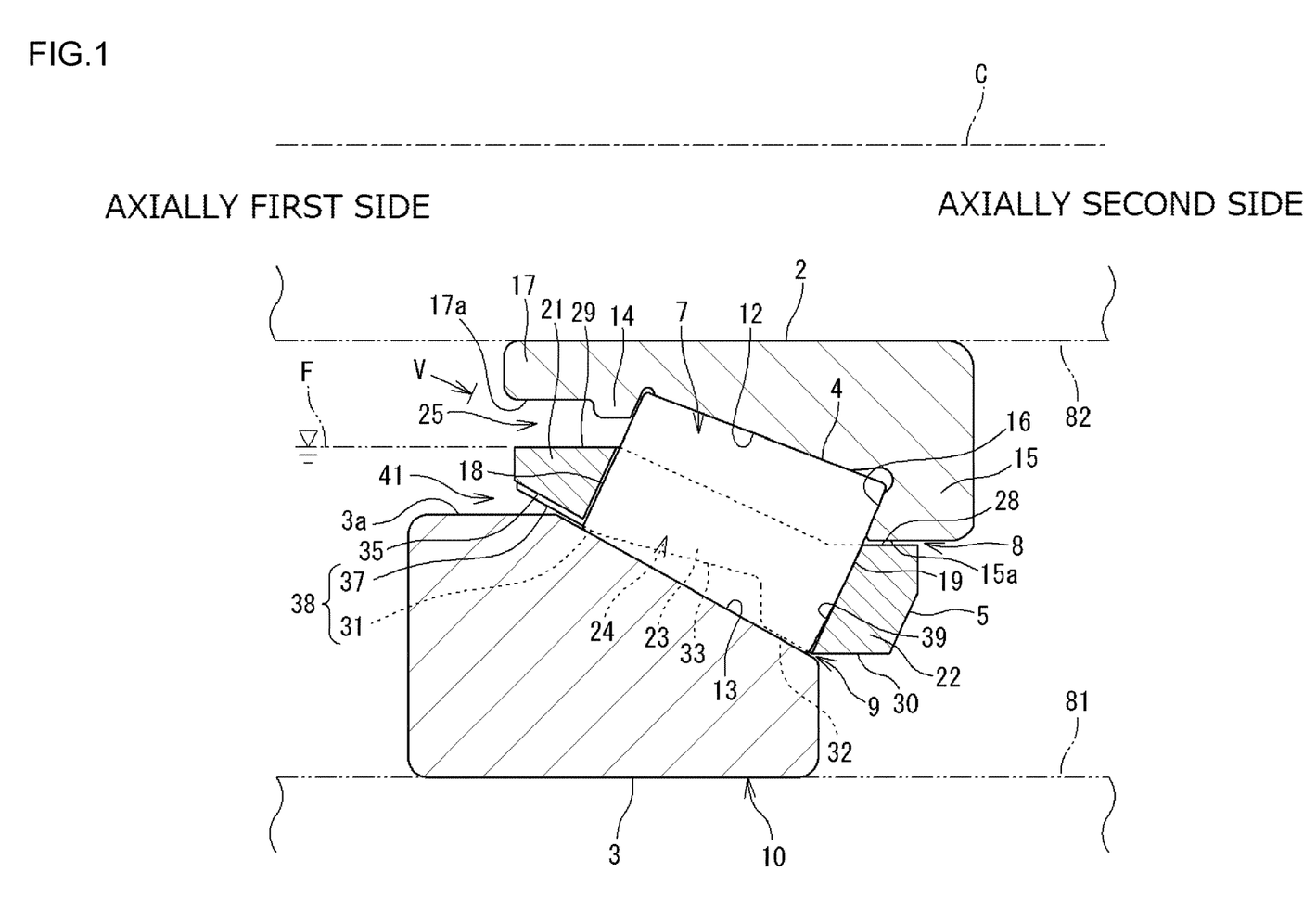
FIG. 1 is a sectional view depicting an embodiment of a tapered roller bearing.

An embodiment of the invention will be described below based on the drawings. FIG. 1 is a sectional view depicting an embodiment of a tapered roller bearing. A tapered roller bearing 10 in the present embodiment is used for a differential pinion in a construction machine such as a wheel loader. The tapered roller bearing 10 supports, in a housing 81, a shaft 82 that rotates along with a pinion, so as to make the shaft 82 rotatable. Lubricant (oil) is stored in the housing 81. The lubricant is used to lubricate the tapered roller bearing 10. The tapered roller bearing 10 described below may also be used for other applications.

The tapered roller bearing 10 includes an inner ring 2, an outer ring 3, a plurality of tapered rollers 4, and a cage 5. The inner ring 2, the outer ring 3, and the cage 5 are annular members all centered around a common axis C.

The inner ring 2 is formed using bearing steel, steel for machine structural use, or the like and has an inner raceway surface 12 formed on an outer peripheral side of the inner ring 2 and on which the tapered rollers 4 roll. The inner raceway surface 12 has a conical shape (tapered shape) having a diameter increasing from an axially first side (in FIG. 1, a left side) toward an axially second side (in FIG. 1, a right side). The inner ring 2 has a cone front face rib (hereinafter, referred to as a small rib) 14, a cone back face rib (hereinafter, referred to as a large rib) 15, and a cylindrical portion 17. The small rib 14 is provided on the axially first side with respect to the inner raceway surface 12 and protrudes outward in a radial direction. The large rib 15 is provided on the axially second side with respect to the inner raceway surface 12 and protrudes outward in the radial direction. The cylindrical portion 17 extends from the small rib 14 toward the axially first side.

The outer ring 3 is formed using bearing steel, steel for machine structural use, or the like, and has, on an inner peripheral side, an outer raceway surface 13 that faces the inner raceway surface 12 and on which the tapered rollers 4 roll. The outer raceway surface 13 has a conical shape (tapered shape) having a diameter increasing from the axially first side toward the axially second side.

The tapered rollers 4 are members formed using bearing steel or the like. The tapered rollers 4 are provided in an annular space 7 formed between the inner ring 2 and the outer ring 3, and can roll on the inner raceway surface 12 and the outer raceway surface 13. Each of the tapered rollers 4 has a small end face 18 located on the axially first side and having a small diameter and a large end face 19 located on the axially second side and having a large diameter. The large end face 19 is in contact with a rib surface (side surface) 16 of the large rib 15 of the inner ring 2. Rotation of the tapered roller bearing 10 (in the present embodiment, the inner ring 2) brings the large end face 19 and the rib surface 16 into sliding contact with each other.

Figure 2:
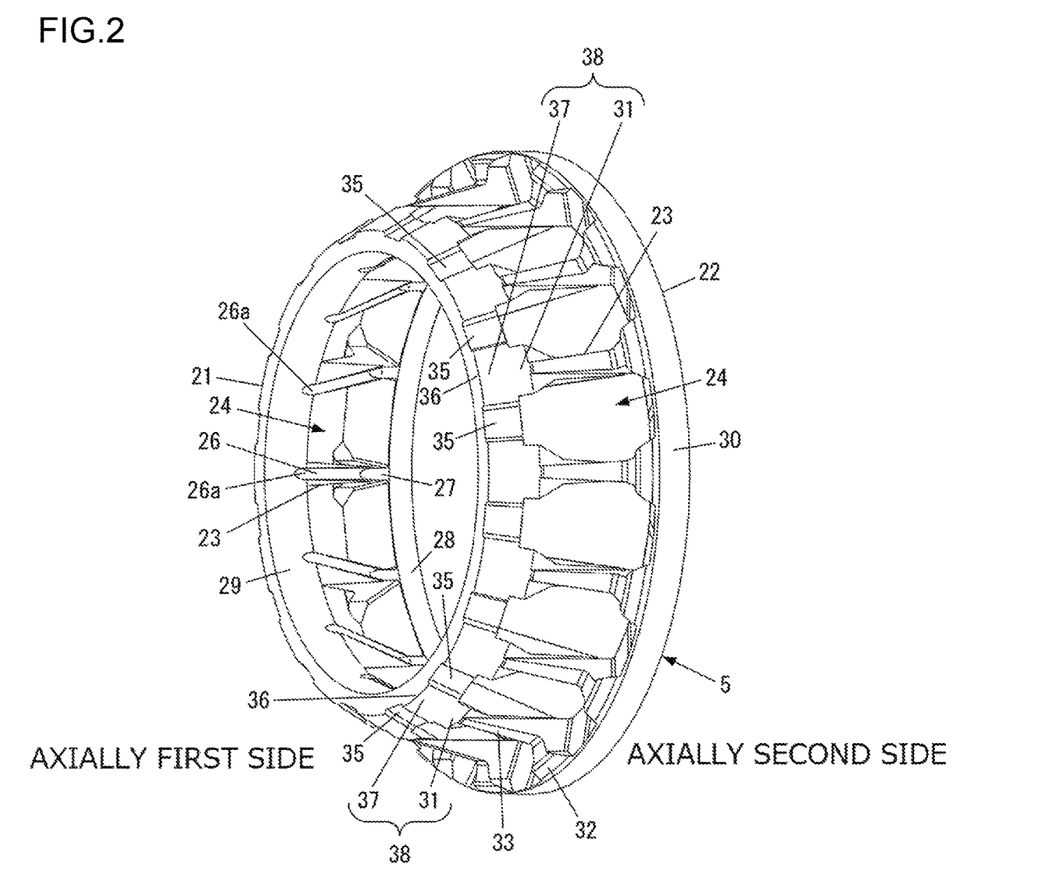
FIG. 2 is a perspective view of a cage.

The cage 5 is provided in the annular space 7 along with the tapered rollers 4 to hold the tapered rollers 4. FIG. 2 is a perspective view of the cage 5. In FIG. 1 and FIG. 2, the cage 5 has a small annular portion 21 shaped like a ring, a large annular portion 22 shaped like a ring, and a plurality of cage bars 23. The small annular portion 21 is positioned toward the axially first side with respect to the tapered rollers 4. The large annular portion 22 is positioned toward the axially second side with respect to the tapered rollers 4. The cage bars 23 couple the small annular portion 21 and the large annular portion 22 together. The large annular portion 22 has a larger outside diameter than the small annular portion 21, and in the present embodiment, also has a larger bore diameter than the small annular portion 21. The cage bars 23 are provided at intervals in a circumferential direction. Pockets 24 in which the respective tapered rollers 4 are housed (held) are spaces each formed between the small annular portion 21 and the large annular portion 22 and between two cage bars 23, 23 adjacent to each other in the circumferential direction. The circumferential direction is a direction around an axis C of the tapered roller bearing 10.

The cage 5 in the present embodiment is formed of resin (formed of a synthetic resin) by injection molding.

In the tapered roller bearing 10, rotation of the bearing (inner ring 2) results in a pump action that allows lubricant to flow from the axially first side toward the axially second side. The mechanism of generation of the pump action is as described below. The lubricant and air present in the annular space 7 have force components that act outward in the radial direction based on a centrifugal force resulting from rotation of the bearing. The outer raceway surface 13 of the outer ring 3 has a conical shape as described above. Thus, the lubricant and air in the annular space 7 flow toward the axially second side along the outer raceway surface 13. Generation of this flow leads to an action that draws the lubricant and air present in a bearing exterior on the axially first side, into the annular space 7. Consequently, the tapered roller bearing 10 is subjected to the pump action that allows the lubricant to flow from the axially first side to the axially second side.

Figure 3:
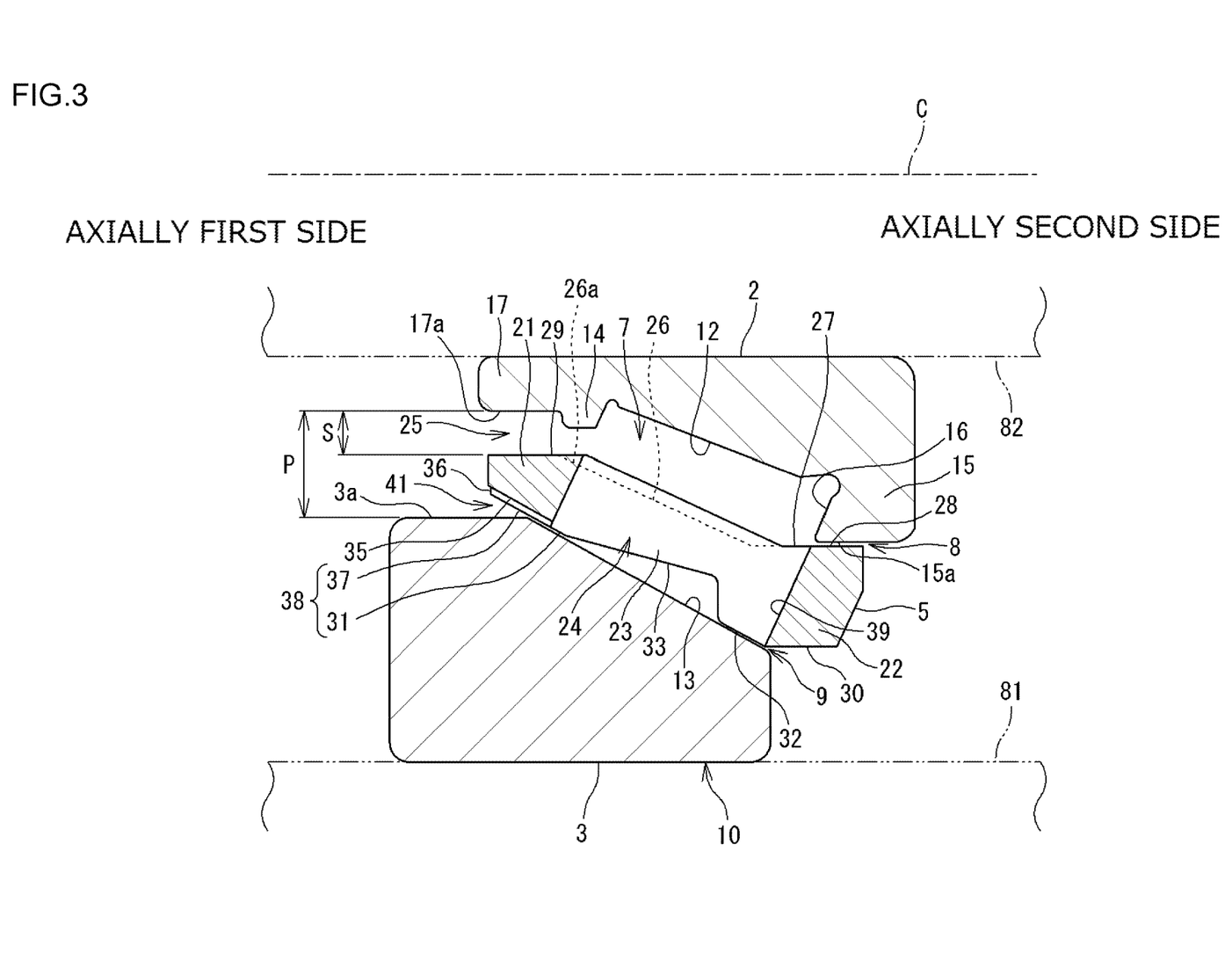
FIG. 3 is a sectional view corresponding to the sectional view depicted in FIG. 1 and from which a tapered roller is removed.

FIG. 3 is a sectional view corresponding to the sectional view depicted in FIG. 3 and from which the tapered roller 4 is removed. On the axially first side of the cage bars 23 and on a radially outer side of the cage bars 23 (closer to the outer ring 3 than to the inner ring 2), the cage 5 has a first guide surface 31 that can come into contact with a part of an inner peripheral surface (outer raceway surface 13) of the outer ring 3. On the axially second side of the cage bars 23 and on the radially outer side of the cage bars 23 (closer to the outer ring 3 than to the inner ring 2), the cage 5 has a second guide surface 32 that can come into contact with another part of the inner peripheral surface (outer raceway surface 13) of the outer ring 3. A recessed surface 33 is formed between the first guide surface 31 and the second guide surface 32 and away from the inner peripheral surface of the outer ring 3.

When the cage 5 and the outer ring 3 are concentrically placed (as illustrated in FIG. 3), a minute clearance is formed between the first guide surface 31 and the inner peripheral surface of the outer ring 3. A minute clearance is formed between the second guide surface 32 and the inner peripheral surface of the outer ring 3. In contrast, radial displacement of the cage 5 with respect to the outer ring 3 allows the first guide surface 31 to come into contact with the inner peripheral surface of the outer ring 3, while allowing the second guide surface 32 to come into contact with the inner peripheral surface of the outer ring 3. Thus, the cage 5 can come into contact with the inner peripheral surface of the outer ring 3 so that the contact allows the cage to be positioned in the radial direction. In other words, the tapered roller bearing 10 is an outer-ring guiding bearing in which the cage 5 is guided by the outer ring 3.

As depicted in FIG. 3, introduction channels 35 are formed in the small annular portion 21 of the cage 5. The introduction channels 35 are channels through which the lubricant can be introduced from the bearing exterior on the axially first side into the annular space 7. The introduction channels 35 may be holes that penetrate the small annular portion 21 in the axial direction (not depicted in the drawings). However, the introduction channels 35 in the present embodiment are grooves formed on an outer peripheral side of the small annular portion 21. In other words, an outer peripheral surface of the small annular portion 21 is shaped to have recesses and protrusions along the circumferential direction as depicted in FIG. 2. Recessed portions of the recess and protrusion shape form the introduction channels 35. An outer peripheral surface 37 of each protruding portion 36 of the recess and protrusion shape is continuous with the first guide surface 31. Consequently, the outer peripheral surface 37 and the first guide surface 31 together form one radially outer surface 38. A part of the radially outer surface 38 can come into contact with the inner peripheral surface of the outer ring 3 to allow the cage 5 to be guided by the outer ring 3.

As described above (see FIG. 2), the plurality of pockets 24 is formed in the cage 5 along the circumferential direction thereof. Circumferential positions of the pockets 24 coincide with circumferential positions of the introduction channels 35. In other words, the introduction channels 35 are open in the respective pockets 24. As described above, the introduction channels 35 are grooves formed in the outer peripheral surface of the small annular portion 21 in the axial direction. As depicted in FIG. 3, the introduction channels 35 are open toward the bearing exterior on the axially first side and are also open in the annular space 7 (pockets 24). Thus, even when the radially outer surface 38 of the cage 5 is in contact with a part of the inner peripheral surface of the outer ring 3, the lubricant present on the axially first side can flow into the annular space 7 (pockets 24) through the introduction channels 35.

Figure 4:
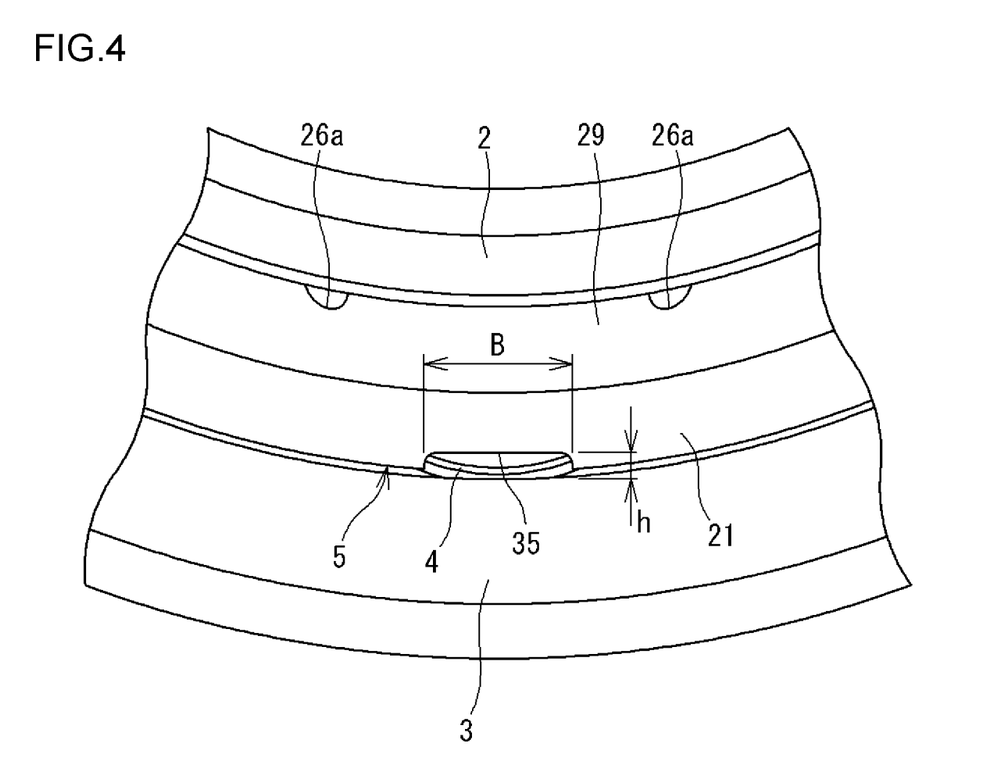
FIG. 4 is a diagram of the tapered roller bearing viewed in the direction of arrow V.

FIG. 4 is a diagram of the tapered roller bearing as viewed in the direction of arrow V in FIG. 1 (a perspective view of the cage 5 and a periphery thereof as seen along a direction along a center line of each tapered roller 4). Each of the introduction channels 35 is linearly formed along the direction parallel to the center line of the corresponding tapered roller 4. As depicted in FIG. 4, a part of the tapered roller 4 is seen from the bearing exterior on the axially first side through the corresponding introduction channel 35. In the present embodiment, the introduction channel 35 is a groove with a flat shape that has a constant depth (groove depth) h in a groove longitudinal direction (the direction from the bearing exterior toward the annular space 7) and that is larger in a width direction (circumferential direction) B than in the direction of the depth h. The depth h is set to a value at which the lubricant on the axially first side can pass through the introduction channel 35 due to the weight of the lubricant. For example, the depth h may be 1 millimeter. The introduction channel 35 may have a sectional shape other than a rectangle depicted in FIG. 4.

As depicted in FIG. 1 and FIG. 3, the small annular portion 21 of the cage 5 and the outer ring 3 are located close to each other (or can come into contact with each other). However, the small annular portion 21 and the inner ring 2 are located away from each other, and an annular space portion 25 is formed between the small annular portion 21 and (a part of) the cylindrical portion 17 located on the axially first side of the inner ring 2. A radial dimension S (see FIG. 3) of the space portion 25 is larger than a radial dimension of a clearance formed between an outer peripheral surface 37 of a protruding portion 36 of the small annular portion 21 and the outer raceway surface 13 of the outer ring 3. The space portion 25 enables the lubricant present in the bearing exterior on the axially first side to pass into the annular space 7. In FIG. 3, the radial dimension S of the space portion 25 may be, for example, at least 30% and less than 60% of a radial dimension P between an outer peripheral surface 17a of the inner ring 2 (cylindrical portion 17) and a cylindrical surface 3a of the outer ring 3 at which the bore diameter of the outer ring 3 is minimized.

Figure 5:
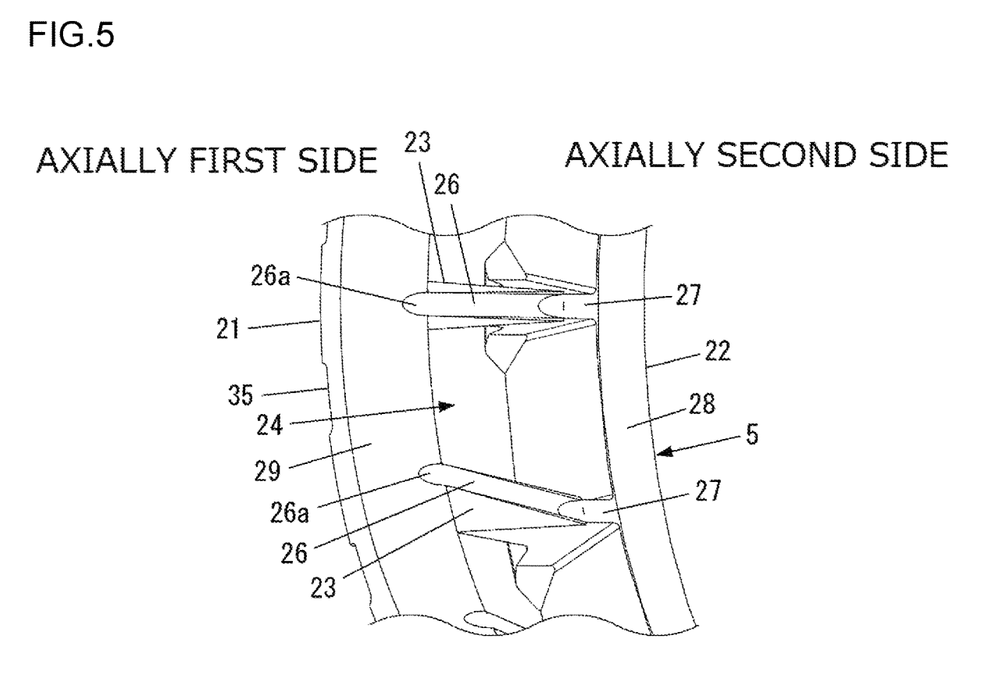
FIG. 5 is an enlarged sectional view depicting a radially inner side of cage bars of the cage.

FIG. 5 is an enlarged view depicting a radially inner side of the cage bars 23 of the cage 5. As depicted in FIG. 2, FIG. 3, and FIG. 5, in a radially inner surface of each cage bar 23, a groove 26 is formed that extends from the small annular portion 21 toward the large annular portion 22. An axially-first-side end 26a of the groove 26 is open in an inner peripheral surface 29 of the small annular portion 21. In other words, the axially-first-side end 26a of the groove 26 connects to the inner peripheral surface 29 of the small annular portion 21. On the axially second side and on the radially inner side of each cage bar 23, a cage bar inner surface 27 is formed that is continuous with an inner peripheral surface 28 of the large annular portion 22. The groove 26 connects to the cage bar inner surface 27. Thus, in FIG. 3, the lubricant present on an inner peripheral side of the small annular portion 21 of the cage 5 flows toward the axially second side as a result of the pump action and can then flow into the grooves 26. The lubricant thus flows along the grooves 26. The lubricant having flowed along the grooves 26 reaches the cage bar inner surfaces 27. The large rib 15 of the inner ring 2 and the large annular portion 22 are located close to each other. A minute clearance 8 is formed between the inner peripheral surface 28 of the large annular portion 22 and an outer peripheral surface 15a of the large rib 15 to hinder passage of the lubricant. Thus, most of the lubricant having flowed along the grooves 26 in the cage bars 23 of the cage 5 and reached the cage bar inner surfaces 27 can remain in the annular space 7 instead of passing through the minute clearance 8. In particular, the lubricant having reached the cage bar inner surfaces 27 is fed to the area between the rib surface 16 of the large rib 15 and the large end face 19 of each tapered roller 4 (see FIG. 1). As described above, rotation of the bearing brings the rib surface 16 to come into sliding contact with the large end face 19. Consequently, the lubricant fed through the grooves 26 contributes to lubrication of the sliding contact portion.

Figure 6:
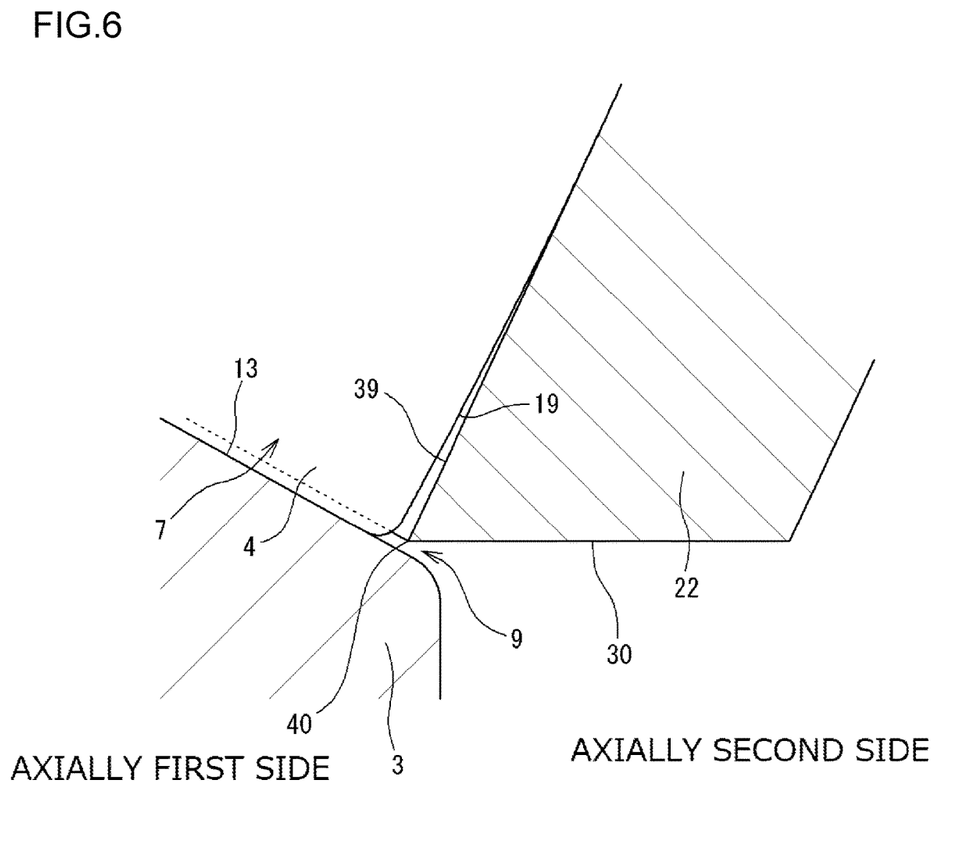
FIG. 6 is an enlarged sectional view depicting an axially second side of the tapered roller bearing.

In FIG. 1, as described above, the outer peripheral surface 15a of the large rib 15 of the inner ring 2 is a cylindrical surface. The inner peripheral surface 28 of the large annular portion 22 of the cage 5 is a cylindrical surface. These cylindrical surfaces face each other in the radial direction via the minute clearance 8. A situation around the outer ring 3 will be described. The outer peripheral surface 30 of the large annular portion 22 of the cage 5 intersects a pocket-side surface 39 faced by the large end face 19 of each tapered roller 4. As depicted in an enlarged sectional view in FIG. 6, the outer peripheral surface 30 and the pocket-side surface 39 intersect each other so as to form an acute angle between the surfaces 30 and 39. An intersection portion 40 between the outer peripheral surface 30 and the pocket-side surface 39 is positioned inward of the inner peripheral surface (outer raceway surface 13) of the outer ring 3 in the radial direction. The intersection portion 40 and the inner peripheral surface (outer raceway surface 13) of the outer ring 3 are located close to each other, with a minute clearance 9 formed between the intersection portion 40 and the inner peripheral surface. Thus, like the inner ring 2-side minute clearance 8 (see FIG. 1), the outer ring 3-side minute clearance 9 (see FIG. 6) hinders passage of the lubricant present in the annular space 7. In other words, the lubricant flowing through the annular space 7 toward the axially second side as a result of the pump action is more likely to flow along the pocket-side surface 39 than through the minute clearance 9. As a result, the lubricant can remain in the annular space 7. The lubricant having flowed along the pocket-side surface 39 is guided to the rib surface 16 of the large rib 15 (see FIG. 1) positioned on an extension of the pocket-side surface 39. The lubricant can then contribute to lubrication of the sliding contact portion.

The tapered roller bearing 10 including the components described above (see FIG. 1) allows the tapered rollers 4 to be stably held and enables temperature elevation of the bearing to be suppressed. That is, the tapered roller bearing 10 is an outer-ring guiding bearing in which the cage 5 is guided by the outer ring 3, and thus, the cage 5 can rotate stably during rotation of the bearing. The tapered rollers 4 are held by the thus stabilized cage 5. Consequently, even if the tapered roller bearing 10 is used for a rotating machine (a travel driving system in a construction machine such as a wheel loader) in which the tapered roller bearing 10 frequently repeats forward and backward rotations, the tapered roller bearing 10, compared to a rolling-element guiding bearing, allows behavior of the tapered rollers 4 to be stabilized to suppress possible skewing. The rolling-element guiding bearing is a bearing in which the cage is positioned in the radial direction by the tapered rollers. To allow the cage 5 to be positioned by the outer ring 3, the clearance between the outer ring 3 and the cage 5 needs to be reduced. This makes the lubricant in the bearing exterior on the axially first side have difficulty flowing into the annular space 7 through the area between the outer ring 3 and the cage 5. However, in the tapered roller bearing 10 in the present embodiment, the introduction channels 35 formed in the small annular portion 21 allow the lubricant to be introduced into the annular space 7. As described above, in the tapered roller bearing 10 in the present embodiment, the cage 5 can be positioned in the radial direction by the outer ring 3, enabling the tapered rollers 4 to be stably held. The lubricant on the axially first side is introduced into the annular space 7 between the inner ring 2 and the outer ring 3 through the introduction channels 35, allowing the tapered roller bearing 10 to be appropriately lubricated.

An outer peripheral surface of the small annular portion 21 facing the axially-first-side cylindrical surface 3a has a conical shape (tapered shape) with a diameter decreasing toward the axially first side. Thus, an annular space 41 formed between the cylindrical surface 3a and the outer peripheral surface of the small annular portion 21 increases in size toward the axially first side. This configuration allows the lubricant present in the bearing exterior on the axially first side to be easily fed into the space 41. Since the introduction channels 35 are formed in the outer peripheral surface of the small annular portion 21 forming the space 41, the lubricant fed into the space 41 can be efficiently introduced into the annular space 7 through the introduction channels 35.

On the axially second side with respect to the tapered roller bearing 10, the minute clearance 8 is formed between the large rib 15 of the inner ring 2 and the large annular portion 22 of the cage 5 as described above. The minute clearance 9 is also formed between the large annular portion 22 and the outer ring 3, enabling the large annular portion 22 to block the axially second side of the annular space 7 (though the minute clearances 8, 9 are present). This allows the lubricant introduced into the annular space 7 to be restrained from flowing out into the bearing exterior on the axially second side. As a result, even if an environment around the tapered roller bearing 10 is such that only a small amount of lubricant is present around the tapered roller bearing 10, the lubricant introduced into the annular space 7 can be effectively utilized.

As described above, rotation of the tapered roller bearing 10 results in the pump action that allows the lubricant to flow from the axially first side to the axially second side. This action allows the lubricant to be introduced into the annular space 7 through the introduction channels 35. Even while the rotation of the tapered roller bearing 10 is stopped, the lubricant present on the axially first side can flow into the annular space 7 through the introduction channels 35 due to the weight of the lubricant. Thus, even when a reduced amount of lubricant is present around the tapered roller bearing 10 (for example, even when the lubricant stored in the housing 81 has an oil level F at a position depicted in FIG. 1), as much of the lubricant can be introduced into the annular space 7 as possible and used to contribute to lubrication. This enables temperature 5 elevation of the tapered roller bearing 10 to be suppressed.

When relatively much lubricant is present around the tapered roller bearing 10, in other words, the oil level F is above the position (the inner peripheral surface 29 of the small annular portion 21) depicted in FIG. 1, since the annular space portion 25 is formed between the small annular portion 21 and the inner ring 2 (cylindrical portion 17), the lubricant can also be introduced into the annular space 7 through the area between the small annular portion 21 and the inner ring 2.

The grooves 26 are formed in the radially inner surfaces of the respective cage bars 23 of the cage 5 (see FIG. 3). The grooves 26 are open in the inner peripheral surface 29 of the small annular portion 21. Thus, the lubricant on the axially first side can flow into and along the grooves 26 toward the axially second side. This allows the lubricant having flowed along the grooves 26 to be easily fed to the sliding contact portion between each tapered roller 4 and the large rib 15 of the inner ring 2. As a result, the lubricant can contribute to the lubrication between each tapered roller 4 and the large rib 15, enabling possible temperature elevation to be effectively suppressed. Each tapered roller 4 and the large rib 15 come into sliding contact with each other. A causal area for heat generation during rotation of the bearing is the area between each tapered roller 4 and the large rib 15. Feeding lubricant to the causal area enables heat generation to be effectively suppressed.

In the present embodiment, the circumferential positions of the pockets 24 in the cage 5 coincide with the circumferential positions of the introduction channels 35, as described above with reference to FIG. 2. Consequently, the lubricant having been introduced through the introduction channels 35 is more easily fed into the pockets 24, allowing enhancement of lubrication between each tapered roller 4 and the inner ring 2, between each tapered roller 4 and the outer ring 3, and between each tapered roller 4 and the corresponding pocket 24.

As described above, one or both of each introduction channel 35 and the annular space portion 25 allow the lubricant to be effectively fed into the annular space 7. Consequently, the whole bearing interior can be more appropriately lubricated. Furthermore, the grooves 26 allow facilitation of feeding of the lubricant to the rib surface 16 of the large rib 15 of the inner ring 2, where particularly significant heat generation occurs. As a result, temperature elevation of the tapered roller bearing 10 can be suppressed.

The above-described embodiment is illustrative in every way and is not restrictive. In other words, the tapered roller bearing in the present invention is not limited to the illustrated forms but may be in any other form within the scope of the present invention. In the above-described embodiment, the tapered roller bearing 10 is used for a differential pinion in a construction machine. However, the tapered roller bearing 10 may be used for any other rotating machine.

The tapered roller bearing in the invention enables the tapered rollers to be stably held, while allowing temperature elevation of the bearing to be suppressed.

What is claimed is:

1. A tapered roller bearing comprising:
an inner ring having, on an outer peripheral side, a conical inner raceway surface with a diameter increasing from an axially first side toward an axially second side;
an outer ring having, on an inner peripheral side, a conical outer raceway surface with a diameter increasing from the axially first side toward the axially second side;
a plurality of tapered rollers provided in an annular space formed between the inner ring and the outer ring and configured to roll on the inner raceway surface and the outer raceway surface; and
an annular cage that holds the tapered rollers, wherein:
the cage has a small annular portion positioned toward the axially first side with respect to the tapered rollers, a large annular portion positioned toward the axially second side with respect to the tapered rollers, a plurality of cage bars that couples the small annular portion and the large annular portion together, and pockets that are formed between the small annular portion and the large annular portion, and between the cage bars adjacent to each other in a circumferential direction such that the tapered rollers are each housed in a respective pocket,
the cage is configured to contact an inner peripheral surface of the outer ring to be positioned in a radial direction,
the small annular portion is provided with introduction channels through which lubricant is enabled to be introduced from a bearing exterior on the axially first side into the annular space,
the introduction channels are present only in the small annular portion, and
circumferential positions of the introduction channels coincide with circumferential positions of the pockets.

2. The tapered roller bearing according to claim 1, wherein
each of the introduction channels is a groove formed on an outer peripheral side of the small annular portion.

3. The tapered roller bearing according to claim 2, wherein
between the small annular portion and a part of the axially first side of the inner ring, an annular space portion is formed through which the lubricant present in the bearing exterior on the axially first side is enabled to pass into the annular space.

4. The tapered roller bearing according to claim 2, wherein
the inner ring has a large rib located on the axially second side to come into sliding contact with a large end face of each tapered roller, and
on a radially inner surface of each of the cage bars, a groove is formed that extends from the small annular portion toward the large annular portion, and the groove is open in an inner peripheral surface of the small annular portion.

5. The tapered roller bearing according to claim 2, wherein
a clearance is formed between the inner ring and the large annular portion and between the outer ring and the large annular portion respectively.

6. The tapered roller bearing according to claim 1, wherein
between the small annular portion and a part of the axially first side of the inner ring, an annular space portion is formed through which the lubricant present in the bearing exterior on the axially first side is enabled to pass into the annular space.

7. The tapered roller bearing according to claim 6, wherein
the inner ring has a large rib located on the axially second side to come into sliding contact with a large end face of each tapered roller, and
on a radially inner surface of each of the cage bars, a groove is formed that extends from the small annular portion toward the large annular portion, and the groove is open in an inner peripheral surface of the small annular portion.

8. The tapered roller bearing according to claim 6, wherein
a clearance is formed between the inner ring and the large annular portion and between the outer ring and the large annular portion respectively.

9. The tapered roller bearing according to claim 1, wherein
the inner ring has a large rib located on the axially second side to come into sliding contact with a large end face of each tapered roller, and
on a radially inner surface of each of the cage bars, a groove is formed that extends from the small annular portion toward the large annular portion, and the groove is open in an inner peripheral surface of the small annular portion.

10. The tapered roller bearing according to claim 1, wherein
a clearance is formed between the inner ring and the large annular portion and between the outer ring and the large annular portion respectively.

11. The tapered roller bearing according to claim 1, wherein:
an outer peripheral surface of the small annular portion comprises recessed portions and protruding portions disposed along the circumferential direction;
the recessed portions form the introduction channels; and
an outer peripheral surface of each of the protruding portions forms part of a radially outer surface that is configured to contact the inner peripheral surface of the outer ring.

12. The tapered roller bearing according to claim 1, wherein
an outer peripheral surface of the small annular portion facing a cylindrical surface of the outer ring on the axially first side has a conical shape, such that a diameter of the outer peripheral surface decreases toward the axially first side.

* * * * *